(12) United States Patent
Anderson, III

(10) Patent No.: US 8,961,063 B2
(45) Date of Patent: Feb. 24, 2015

(54) HUB CLAMP ASSEMBLY

(75) Inventor: James H. Anderson, III, York, PA (US)

(73) Assignee: Coupling Corporation of America, Inc., Jacobus, PA (US)

( * ) Notice: Subject to any disclaimer, the term of this patent is extended or adjusted under 35 U.S.C. 154(b) by 510 days.

(21) Appl. No.: 12/958,715

(22) Filed: Dec. 2, 2010

(65) Prior Publication Data

US 2012/0141201 A1  Jun. 7, 2012

(51) Int. Cl.
*F16D 1/094* (2006.01)

(52) U.S. Cl.
CPC ........ *F16D 1/094* (2013.01); *F16D 2001/0945* (2013.01)
USPC .......................................... 403/370; 285/323

(58) Field of Classification Search
USPC ......... 403/192, 193, 195, 199, 365, 367, 368, 403/369, 370, 371, 373, 374.1, 374.2, 374.4
See application file for complete search history.

(56) References Cited

U.S. PATENT DOCUMENTS

| | | | |
|---|---|---|---|
| 2,849,886 A * | 9/1958 | McCloskey | 474/41 |
| 2,946,611 A | 7/1960 | Moyer | |
| 3,596,943 A * | 8/1971 | Krauss | 403/370 |
| 3,638,974 A | 2/1972 | Stratienko | |
| 4,304,502 A | 12/1981 | Stratienko | |
| 4,311,224 A * | 1/1982 | Kato et al. | 192/56.5 |
| 4,364,687 A * | 12/1982 | Adell | 403/370 |
| 4,367,053 A * | 1/1983 | Stratienko et al. | 403/371 |
| 4,407,603 A | 10/1983 | Lundgren | |
| 4,598,443 A | 7/1986 | Ostling et al. | |
| 4,600,334 A * | 7/1986 | Soussloff | 403/369 |
| 4,630,690 A | 12/1986 | Beasley et al. | |
| 4,655,630 A * | 4/1987 | Rinehart | 403/342 |
| 4,726,703 A * | 2/1988 | Ashley | 403/370 |
| 4,848,953 A | 7/1989 | Young | |

(Continued)

FOREIGN PATENT DOCUMENTS

| | | |
|---|---|---|
| DE | 4318139 A1 * | 12/1993 |
| DE | 19512363 A1 | 10/1996 |

(Continued)

OTHER PUBLICATIONS

Coupling Corporation of America, Vertical Clamp Coupling, Brochure, Feb. 2007, Coupling Corporation of America, Jacobus, Pennsylvania.

(Continued)

*Primary Examiner* — Michael P Ferguson
*Assistant Examiner* — Daniel Wiley
(74) *Attorney, Agent, or Firm* — McNees Wallace & Nurick, LLC

(57) ABSTRACT

A hub clamp assembly includes a hub that has a flange portion and an annular sleeve portion. The sleeve portion has a plurality of substantially longitudinal slits therein extending from a distal end toward the flange portion to form a plurality of sleeve segments. The sleeve portion further has an outer surface that includes a first set of surface features. The assembly also includes an annular collar that has one or more sleeve engagement pieces each having a first surface and an opposing second surface. The first surface of the sleeve engagement piece contains a second set of surface features configured to correspond to and engage the first set of surface features of the sleeve portion of the hub. A support ring surrounds the sleeve portion of the hub and overlies the second surface of the sleeve engagement pieces.

6 Claims, 8 Drawing Sheets

(56) References Cited

U.S. PATENT DOCUMENTS

| | | | |
|---|---|---|---|
| 5,039,245 A * | 8/1991 | Hansen | 403/370 |
| 5,067,847 A * | 11/1991 | Muellenberg | 403/370 |
| 5,123,772 A | 6/1992 | Anderson | |
| 5,174,680 A * | 12/1992 | Nakamura et al. | 403/370 |
| 5,613,795 A | 3/1997 | Antony et al. | |
| 5,647,685 A * | 7/1997 | Fukui et al. | 403/370 |
| 6,152,604 A | 11/2000 | Ostling et al. | |
| 6,234,910 B1 | 5/2001 | Norberg | |
| 6,375,383 B1 * | 4/2002 | Ostling et al. | 403/374.3 |
| 6,736,027 B2 * | 5/2004 | Ostling et al. | 74/578 |
| 7,037,026 B2 | 5/2006 | Ostling et al. | |
| 7,309,187 B2 | 12/2007 | Swanson | |
| 2004/0096271 A1 * | 5/2004 | Peter et al. | 403/374.3 |
| 2007/0069594 A1 | 3/2007 | Braun | |

FOREIGN PATENT DOCUMENTS

| | | |
|---|---|---|
| DE | 10219931 A1 | 11/2003 |
| DE | 102005055822 A1 | 6/2006 |

OTHER PUBLICATIONS

Coupling Corporation of America, Anderson Clamp Hub, Brochure, 2005, Coupling Corporation of America, Jacobus, Pennsylvania.

* cited by examiner

HUB CLAMP ASSEMBLY

FIELD OF THE INVENTION

The present invention is directed to a coupling and more particularly to an assembly for connecting a shaft to a hub for the transfer of torque.

BACKGROUND OF THE INVENTION

It is common for a motor be used to drive a shaft, which transfers torque from the motor to be used as mechanical energy for driving a pump, ship propeller or any number of other applications.

Many current couplings are provided as separate pieces used to attach the shaft to a hub to which a gear or other device is attached. In cases where torque is to be transmitted between a shaft and a hub or wheel mounted thereon, such as where a hub is mounted on the end of a driving shaft for connection through a flexible coupling to a similar hub mounted on the end of a driven shaft, or where a turbine wheel is mounted on a shaft, any of several attachment means have heretofore been used; however, each presents problems.

A straight keyed shaft connection comprises keyways cut into the shaft and into the side of the central hole of the hub or wheel; the keyways are radially aligned and a key is inserted to lock the hub or wheel to the shaft. In high speed and high torque applications where extremely tight fits between the interconnected components are important, the required tightness is usually achieved by making the bore in the hub or wheel slightly smaller than the diameter of the shaft, expanding the hub or wheel by the application of heat, slipping the hub or wheel onto the shaft, and allowing it to cool and contract over the shaft resulting in a very tight interference fit with the shaft. This type of connection has several disadvantages. For one, the keyway cut into the shaft produces high stress concentrations which are aggravated with the use of heat for shrink-fitting the hub or wheel on the shaft. The need for precise tolerances in the keyways makes manufacturing difficult and frequently time consuming. Where heat is used to produce a shrink fit, the torches or special heaters required can present a hazard, depending on the environment in which the assembly is carried out.

Tapered key shaft hubs are sometimes used because by making a taper in the bore, a hub can be tightened on a shaft by rotating a nut threaded onto an extension of the shaft which protrudes past the hub. That is, the threaded engagement is used to draw the hub over the tapered portion of the shaft. However, it is extremely difficult to accurately machine a tapered bore and to match bores between shaft and hub, making this type of connection expensive and difficult to consistently achieve. Further, a tapered shaft hub also has the disadvantage that stress concentrations can occur in the keyway, greatly reducing the effective strength of the connection.

Both types of keyed shaft connections generally require torch heating for removal.

An alternative to such an arrangement is disclosed in U.S. Pat. No. 5,123,772, which teaches a coupling in which the hub itself is configured to act as the clamp. While this clamping arrangement operates in a largely satisfactory manner in many cases, these and other clamps of this style can be challenging due to difficulties sometimes associated with precision machining of the meshing threads. Furthermore, in large scale applications, significant part weight of the clamp renders handling more difficult during manufacture, particularly when performing quality checks to confirm the accuracy of the threading.

These and other drawbacks are found in current assemblies for connecting a hub to a shaft.

What is needed is a hub clamp that can provide improved handling during manufacture and subsequent assembly.

SUMMARY OF THE INVENTION

According to an exemplary embodiment of the invention, a hub clamp is disclosed. The hub clamp comprises a hub and an annular collar. The hub comprises a flange portion and an annular sleeve portion, the flange portion and annular sleeve portion together defining a common passageway through the hub. The sleeve portion has a plurality of substantially longitudinal slits therein extending from a distal end toward the flange portion to form a plurality of sleeve segments, the sleeve portion further having an outer surface comprising a first set of surface features. The annular collar comprises a sleeve engagement piece having a first surface and an opposing second surface, the first surface containing a second set of surface features configured to correspond to and engage the first set of surface features of the sleeve portion. The annular collar further comprises a support ring surrounding the sleeve portion of the hub and overlying the second surface of the sleeve engagement piece.

According to one exemplary embodiment of the invention, the hub comprises a flange portion and an annular sleeve portion, the flange portion and annular sleeve portion together defining a common passageway through the hub, the sleeve portion having a plurality of substantially longitudinal slits therein extending from a distal end toward the flange portion to form a plurality of sleeve segments, and the sleeve portion further having an outer surface comprising concentric, unthreaded grooves. The annular collar comprises a plurality of sleeve engagement pieces together substantially surrounding the sleeve portion, each sleeve engagement piece having a first surface and an opposing second surface, the first surface containing concentric, unthreaded grooves corresponding to the concentric, unthreaded grooves of the outer surface of the sleeve portion, and the annular collar further comprising a support ring surrounding the sleeve portion of the hub and overlying the second surface of the sleeve engagement pieces.

An advantage of exemplary embodiments is that providing a hub clamp assembly having a multi-piece collar results in easier handling during manufacture and installation of the hub clamp assembly, particularly when used in large scale applications in which the assembly itself may weigh hundreds or even thousands of pounds.

Another advantage of certain embodiments is that the use of concentric, non-threaded mating features formed in interfacing surfaces of the collar and hub in combination with a plurality of sleeve engagement pieces avoids the precision machining associated with forming a threaded engagement between the collar and the hub. As a result, machining can be accomplished manually using a lathe and without the use of expensive, complex machines such as a CNC machine.

Other features and advantages of the present invention will be apparent from the following more detailed description of exemplary embodiments, taken in conjunction with the accompanying drawings which illustrate, by way of example, the principles of the invention.

BRIEF DESCRIPTION OF THE DRAWINGS

Where like parts appear in more than one drawing, it has been attempted to use like reference numerals for clarity.

DETAILED DESCRIPTION OF EXEMPLARY EMBODIMENTS

Figure 1A:
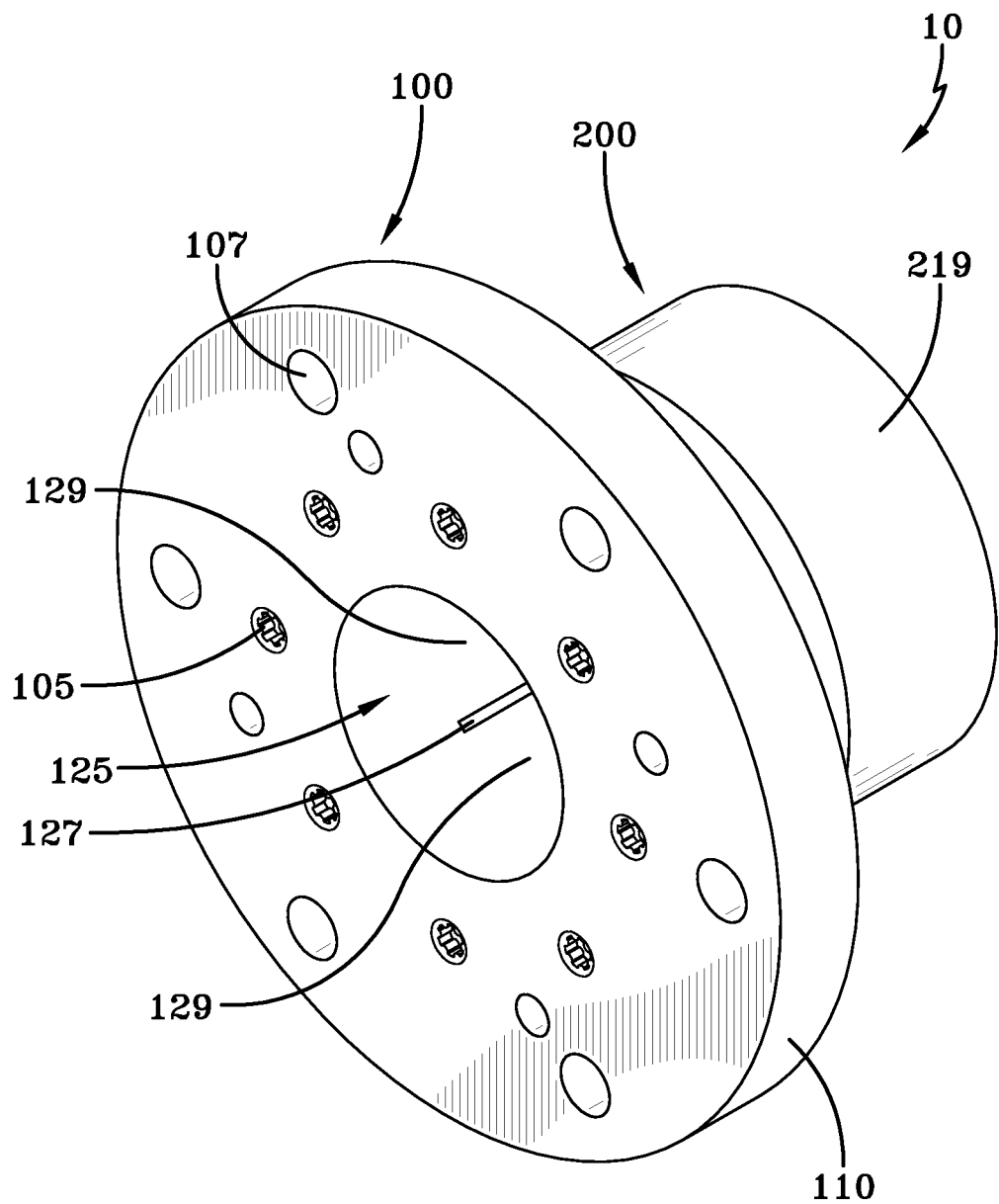
FIGS. 1A and 1B illustrate front and rear perspective views of an assembled clamp hub in accordance with an exemplary embodiment.
Figure 1B:
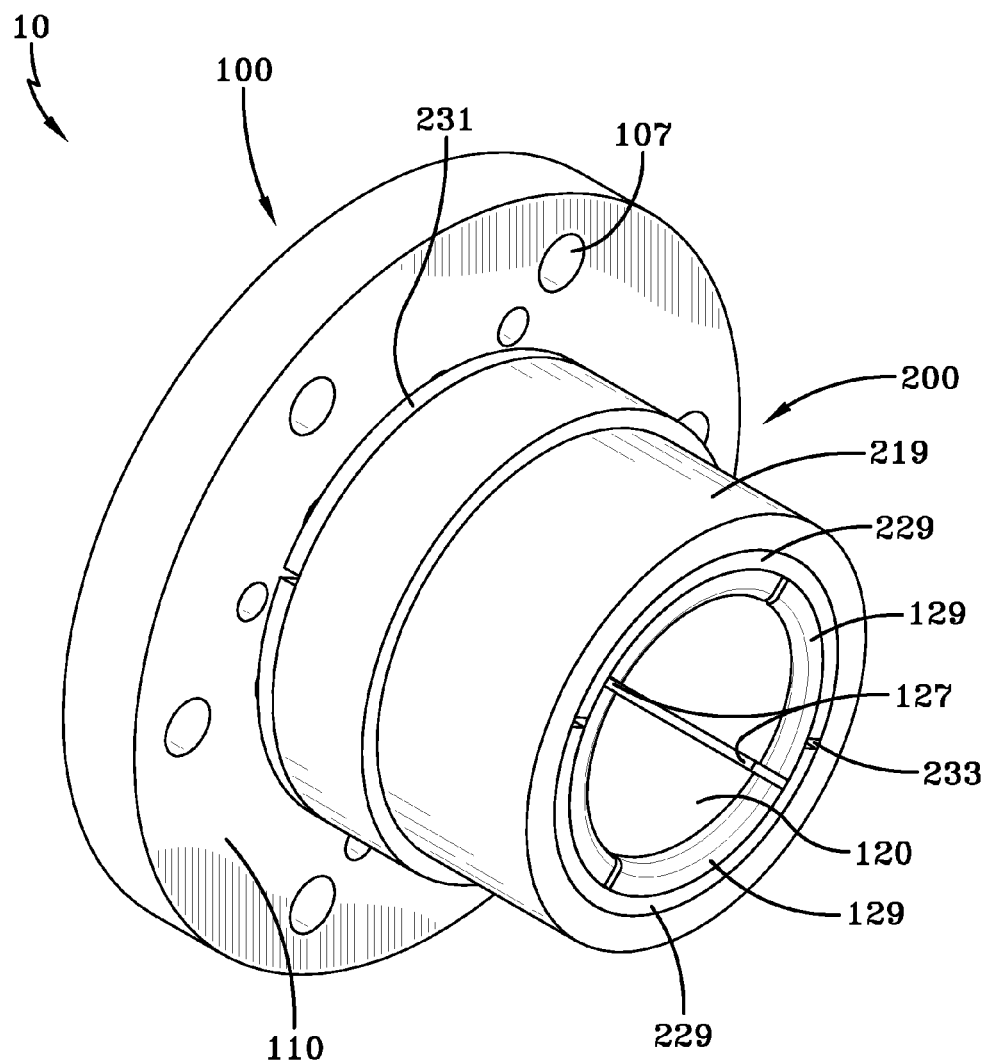

Referring to FIGS. 1A and 1B, a hub clamp assembly 10 is illustrated in accordance with an exemplary embodiment having a hub 100 and an annular collar 200.

Figure 2:
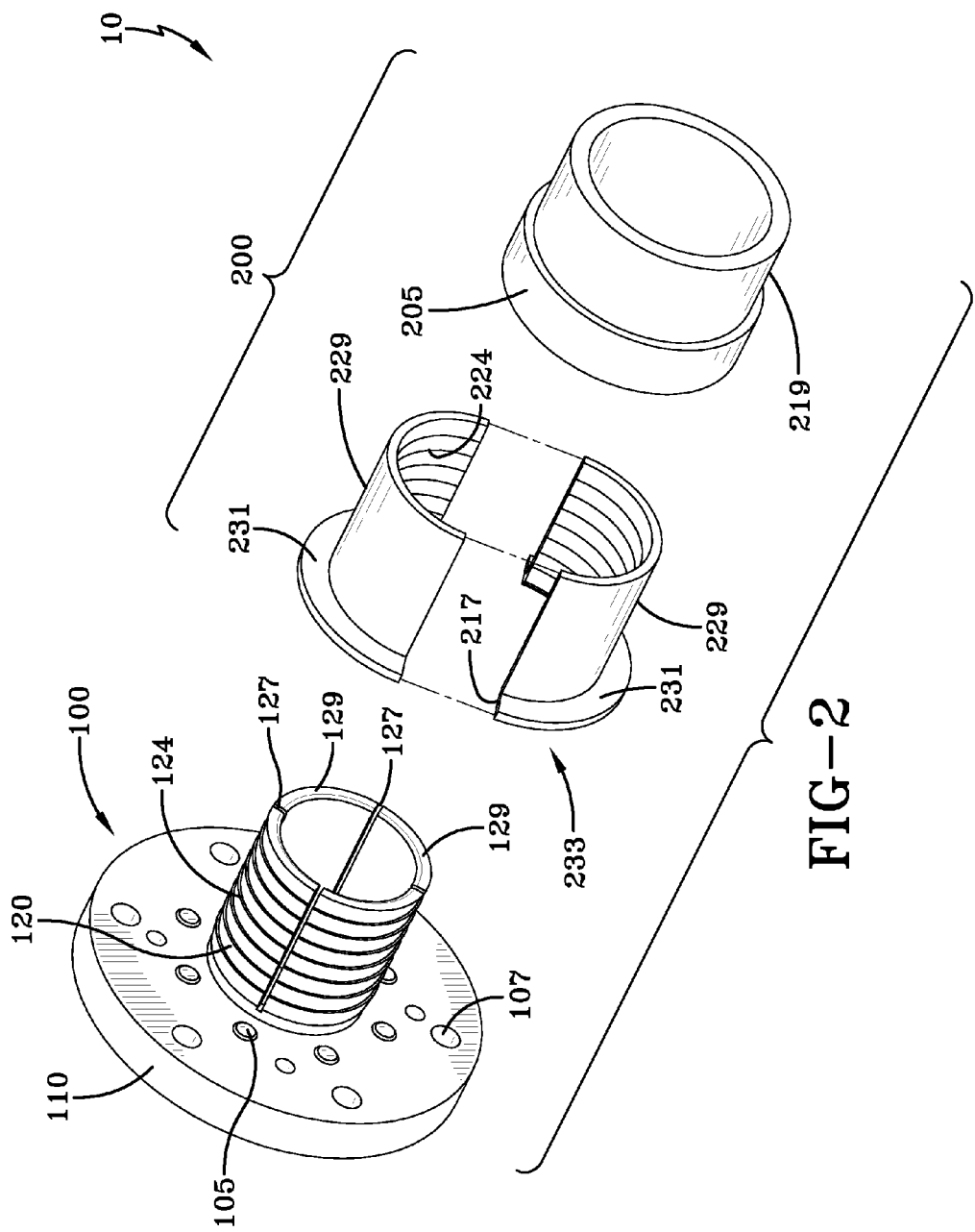
FIG. 2 illustrates an exploded view of a clamp hub in accordance with an exemplary embodiment.

As seen in conjunction with FIG. 2, which illustrates an exploded view of the hub clamp assembly 10 in its unassembled state, the hub 100 includes a flange portion 110 and an annular sleeve portion 120 that extends away from the flange portion 110. The flange and sleeve portions 110, 120 together define a common passageway 125 (FIG. 1A) through the hub 100 in which a shaft (not shown) is inserted and secured within the hub clamp assembly 10. The flange portion 110 typically includes one or more apertures 107 for fastening the hub 100 to a mechanical device, such as a gear, turbine blade, or other device to which the rotational mechanical energy of the shaft is being transferred through the hub 100, such that the assembly 10 serves as both a hub and a clamp. In other embodiments, the gear or other mechanical device may be attached to the hub 100 without the use of fasteners. For example, a heat fit may be used in which the gear being attached is heated, causing it to expand, at which point it is placed over the hub 100. The gear cools and contracts to its ordinary size at ambient temperature, resulting in a secure attachment to the hub 100.

Hub clamp assemblies in accordance with exemplary embodiments may be used in applications in which they are subjected to demanding conditions. The hub clamp assembly 10 may be constructed of a robust material, such as a 4000 series alloy steel. In some embodiments, such as where the hub clamp assembly 10 will be operated in corrosive environments, it may be desirable for the assembly 10 to be constructed of or plated with stainless steel, platinum or other corrosion resistant material. It will be appreciated, however, that the hub clamp assembly 10 can be manufactured of any suitable material and that in addition to the environment of operation, the material selected may also depend on the material of construction of the shaft to which the assembly 10 is being coupled, as well as the torque to be transferred and under which the assembly 10 will operate.

In addition to the possibility of exposure to high temperatures, hub clamp assemblies in accordance with exemplary embodiments may be attached to shafts turning at many thousands of rotations per minute and transferring torque as high as 50 million foot pounds or more. Thus, the flange and sleeve portions 110, 120 are typically cylindrical and concentric to achieve balance when the assembly 10 is in operation and turning about its axis.

The interior surface of the hub 100 that defines the passageway 125 is preferably unthreaded to be able to receive smooth shafts. As a result, expensive machining associated with obtaining or creating threaded shafts can be avoided, although surface features, coatings and other friction enhancements may be provided in the surface defining the passageway 125. It will be appreciated, however, that threaded shafts and/or a threaded passageway are not precluded and will still be secured by the hub clamp assembly 10. Exemplary embodiments include keyless constructions that do not require the use of a keyed shaft or a keyed hub. As a result, neither the shaft nor the hub clamp is required to have any particular relative orientation to one another during assembly.

The elongated annular sleeve portion 120 of the hub 100 has a plurality of substantially longitudinal slits 127 extending from the distal end of the sleeve portion 120 toward the proximal end of the sleeve portion adjacent the flange portion 110. The longitudinal slits 127 may be linear, or non-linear, such as a helical. The arrangement of slits 127 results in the formation of a plurality of sleeve segments 129 in the sleeve portion 120. The slits 127 permit inward radial movement of the sleeve segments 129 against the shaft positioned in the passageway 125 to securely clamp the assembly 10 at a desired location along the shaft's length.

Figure 3:
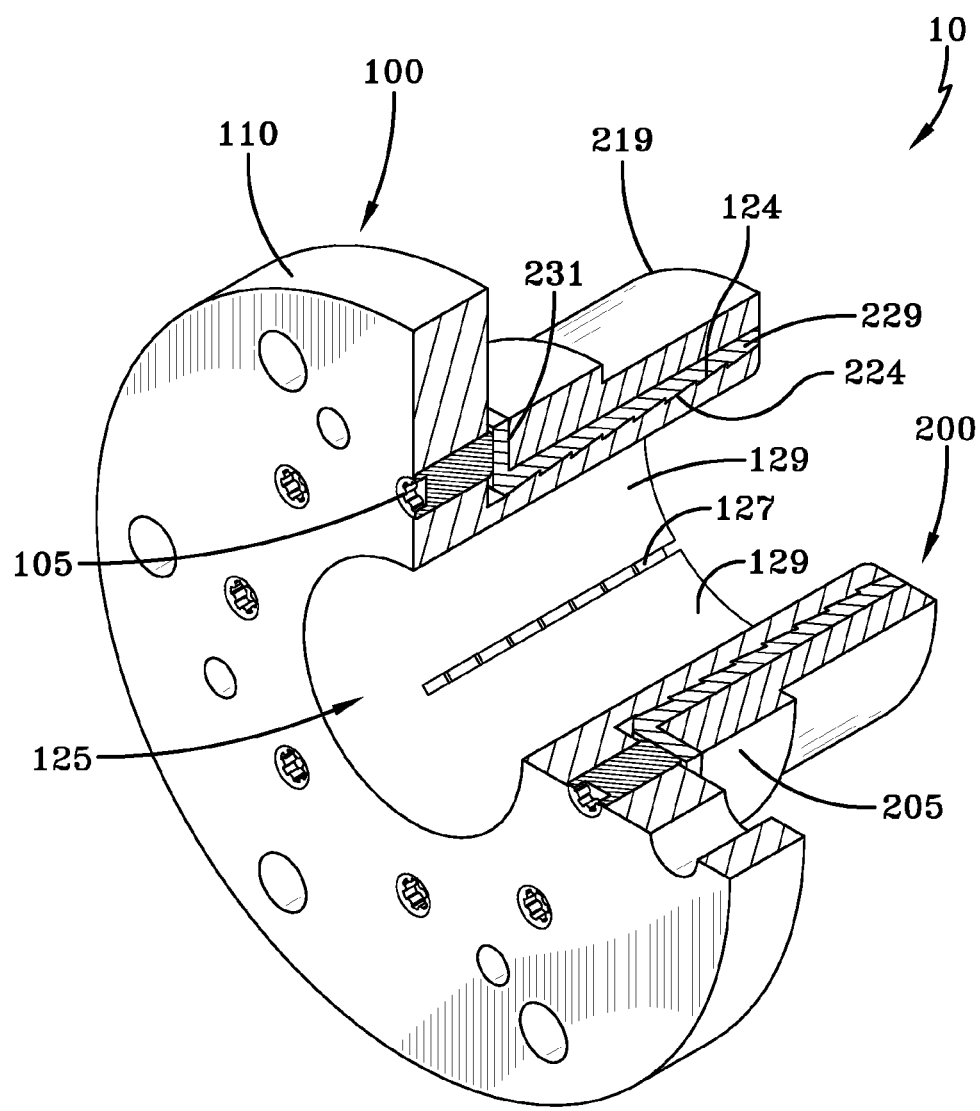
FIG. 3 illustrates a front perspective view of an assembled clamp hub in accordance with an exemplary embodiment, with a portion of the clamp hub removed.

The sleeve portion 120 has an outer surface with undulating surface features having protrusions and indentations. In one embodiment, the undulating features are grooves 124, such as symmetric or asymmetric grooves. In one embodiment, the grooves 124 are concentric, unthreaded grooves and may be asymmetric in the form of buttress grooves, as best illustrated in FIG. 3. According to another embodiment, the grooves 124 are threaded, such as a buttress thread. In either case, the grooves 124 can be engaged by corresponding undulating features, such as grooves 224, formed in the collar 200.

Figure 5:
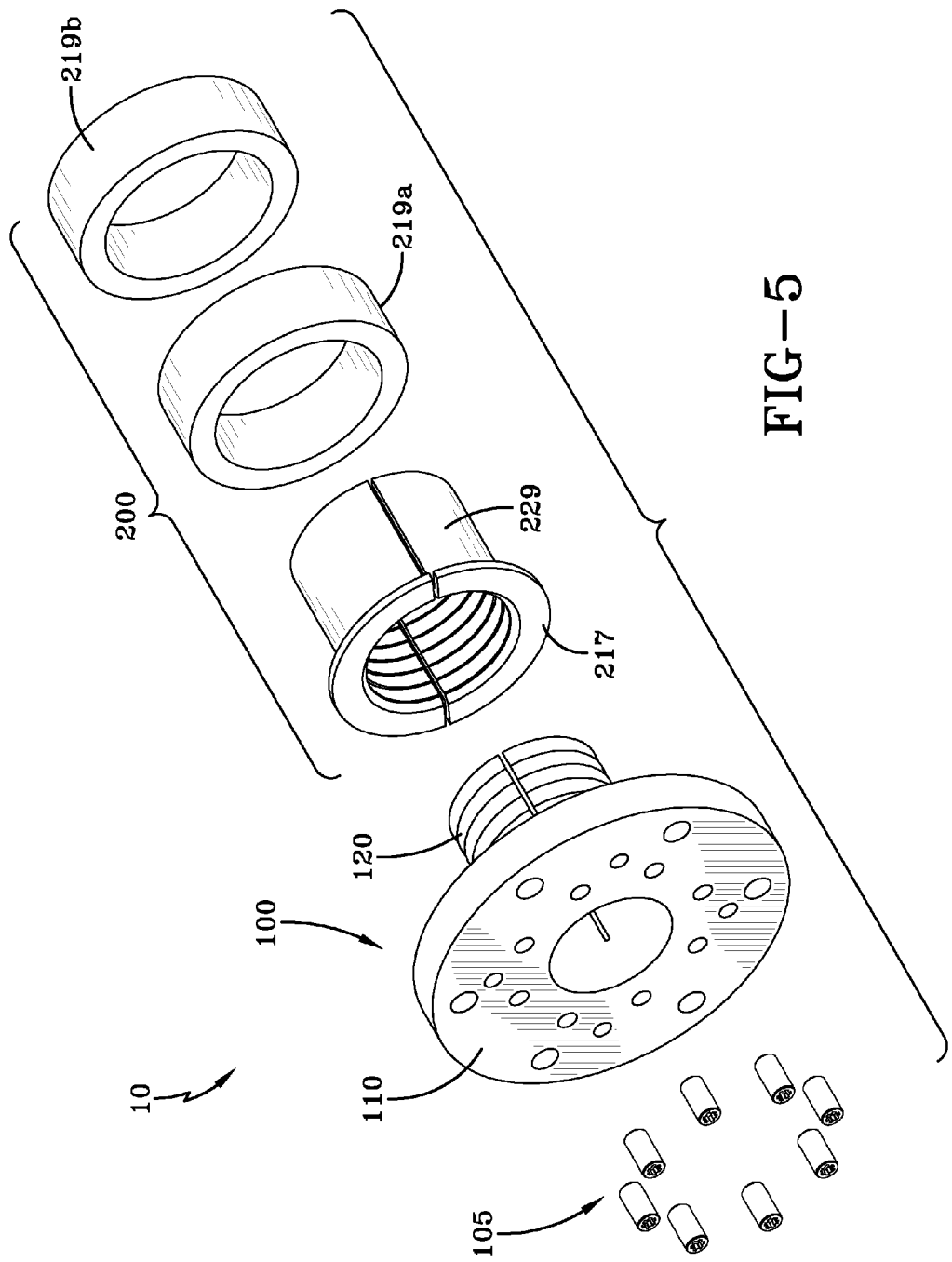
FIG. 5 illustrates an exploded view of a clamp hub in accordance with yet another exemplary embodiment.

Exemplary embodiments employ a multi-piece annular collar 200 that includes at least one sleeve engagement piece 229 and an overlying support ring 219. The support ring 219 surrounds the sleeve portion 120 of the hub 100 and overlies an outer surface of the sleeve engagement piece(s) 229. The use of a multi-piece collar 200 results in easier handling during manufacture and installation of the hub clamp assembly 10, particularly when used in large scale applications in which the hub clamp assembly 10 may weigh hundreds or even thousands of pounds. By splitting the collar 200 into multiple pieces including one or more plurality of sleeve engagement pieces 229 and a support ring 219, the overall weight of the collar 200 is distributed among multiple pieces to ease handling. The weight is not necessarily distributed equally among the various pieces of the multi-piece collar 200. While the support ring 219 is typically the most massive piece of the collar 200, as shown in FIG. 5, the support ring 219 is not necessarily a single unit and may be split, for example, into two or more smaller support ring units 219a, 219b to aid in handling.

As better seen in FIG. 2, in one embodiment, a plurality of sleeve engagement pieces 229 are provided, each one of which forms a portion of an annular ring, such that the sleeve engagement pieces 229 substantially surround the sleeve portion 120 over which the support ring 219 can be positioned. In this embodiment, the corresponding surface features of the sleeve portion 120 and those of the sleeve engagement pieces 229 are concentric rings and thus, are not threaded. This has the advantage of eliminating the need for precise machining associated with ensuring the threading of the sleeve portion 120 matches that of the sleeve engagement pieces 229, a useful advantage that can be realized even in situations where the collar 200 does not otherwise present difficulty in handling.

Each of the sleeve engagement pieces 229 have an inner surface with surface features 224, such as grooves, corresponding to the surface features 124 of the sleeve portion 120. Exemplary embodiments employing a plurality of sleeve engagement pieces 229 may have between two to five individual sleeve engagement pieces, although more pieces may be used. The interface 233 between adjacent sleeve engagement pieces 229 may be a contacting interface or there may be a gap between them. Gaps at the interface may increase the amount of axial movement of the collar 200 needed to move the sleeve segments 129 of the sleeve portion 120 radially inward to achieve a sufficient force to clamp the assembly 10 in place on the shaft. Whether there is a gap at the interface 233 or the sleeve engagement pieces 229 are abutting at the interface 233, the interfaces of the sleeve engagement pieces 229 are preferably designed to be positioned in a manner that results in no interface 233 being in substantial registration with the longitudinal slits 127 of the sleeve portion 120 over which they are situated.

Figure 7:
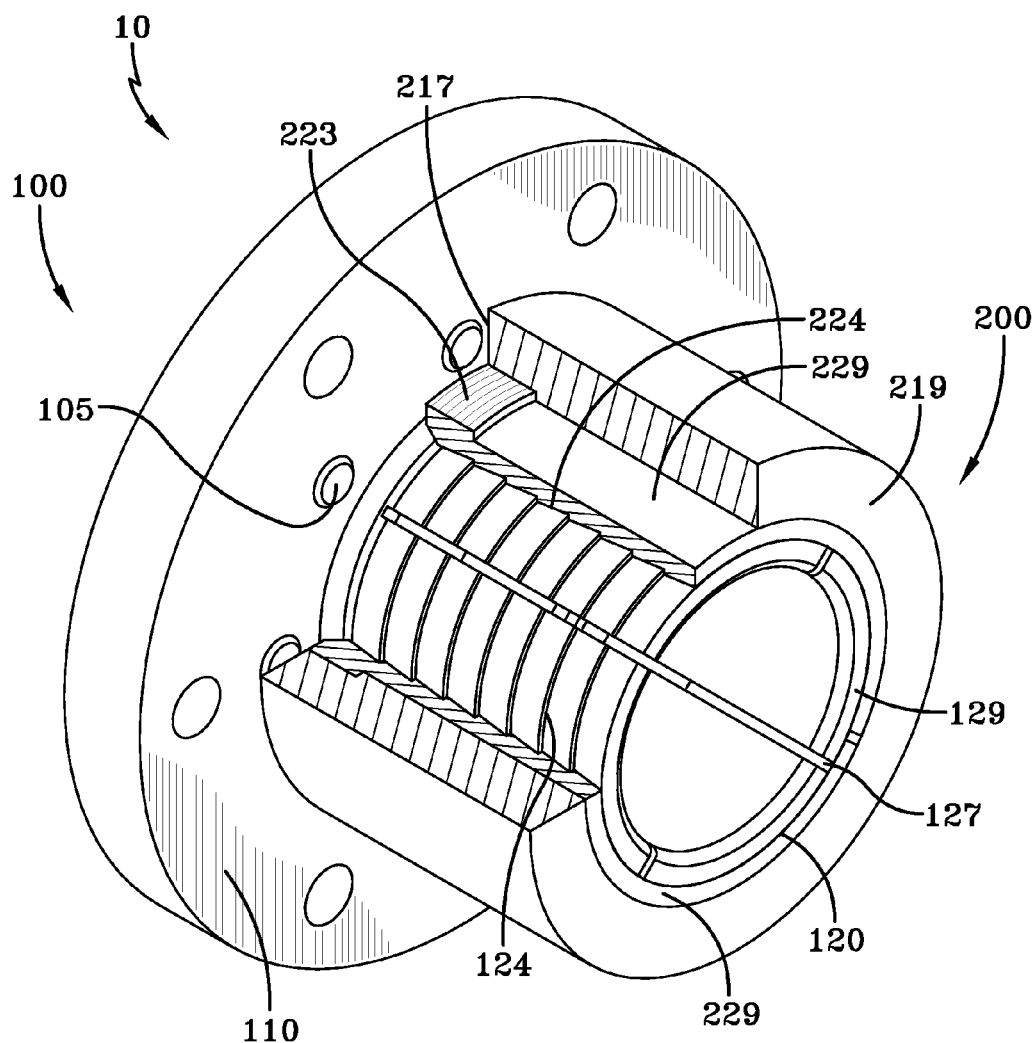
FIG. 7 illustrates a rear perspective view of an assembled clamp hub in accordance with yet another exemplary embodiment, with a portion of the clamp hub removed.

After the sleeve engagement pieces 229 have been positioned about the sleeve portion 120, the support ring 219 can be positioned over the sleeve engagement pieces 229 to secure their engagement with the sleeve segments 129 of the sleeve portion 120. Prior to the support ring 219 being placed over the collectively assembled sleeve engagement pieces 229, the pieces may be held in place by hand, by an adhesive, or some other measure as they are positioned about the sleeve portion 120. In one embodiment, the outer surface of the sleeve engagement pieces 229 and the inner surface of the support ring 219 are both smooth for ease in sliding the support ring over the engagement pieces. In some cases, the inner surface of the support ring 219 and/or the outer surface of the sleeve engagement pieces 229 may be slightly tapered to enhance the engagement. In another embodiment, as shown in FIG. 7, the sleeve engagement pieces 229 include a partially threaded outer surface 223 that, when used with a support ring 219 having a corresponding partially threaded inner surface, may be useful for physically joining the sleeve engagement pieces 229 to the support ring 219. The support ring 219 may optionally include a jacking lip 205, which may be useful in removal or other maintenance of the shaft or the machine to which the shaft is attached.

The sleeve engagement pieces 229 may be provided with a lip 231 disposed intermediate the flange portion 110 of the hub 100 and a facing surface 217 of the support ring 219, so that when the clamp assembly 10 is moved to its operative position as later described, both the sleeve engagement pieces 229 and the support ring 219 move together.

After the assembly 10 has been positioned at a desired location along the shaft to which it will be attached, the assembly 10 can be moved to its operative position to secure the shaft within the passageway 125. This operative position occurs by urging the collar 200 to move axially away from the flange portion 110 and along the sleeve portion 120 in a linear manner. This axial movement urges the sleeve segments 129 radially inward toward each other, resulting in a reduction in cross-sectional area defined by the inner surfaces of the sleeve segments 129 forming the passageway 125 and thereby exerting a clamping force on a shaft positioned in the passageway 125.

The corresponding engaged or mating surface features 124, 224 of the outer surfaces of the sleeve segments 129 and inner surfaces of the sleeve engagement pieces 229 of the collar 200 permit a limited amount of axial travel in which the engaged surfaces provide opposing inclined planes. The pitch of the surface features 124, 224 is such that the amount of axial travel is sufficient to achieve a sufficient corresponding inward radial movement of the sleeve segments 129 to exert the necessary clamping force, but without the features slipping past one another to an adjacent mating feature that could prevent effective clamping.

As illustrated, one manner in which the collar 200 may be urged axially away from the flange portion 110 to its operative position is through a plurality of set screws 105 or other threaded members distributed about the circumference of the flange 110. As the screws 105 are tightened, they emerge from the back side of the flange 110 and contact the lip 231 of the sleeve engagement piece 229, which itself is in contact with the facing surface 217 of the support ring 219. Alternatively, as shown in FIG. 7, in embodiments in which the sleeve engagement pieces 229 are mechanically coupled to the support ring 219, the screws 105 may be positioned to directly contact the facing surface 217 of the support ring 219 as they emerge from the back side of the flange 110.

Turning the screws 105 thus results in urging the collar 200 axially away from the flange 110. It may further be desirable to load the set screws 105 to a predetermined torque using a torque wrench or the like, to further ensure a radially uniform clamping force is exerted by the sleeve segments 129 on the shaft.

Figure 6:
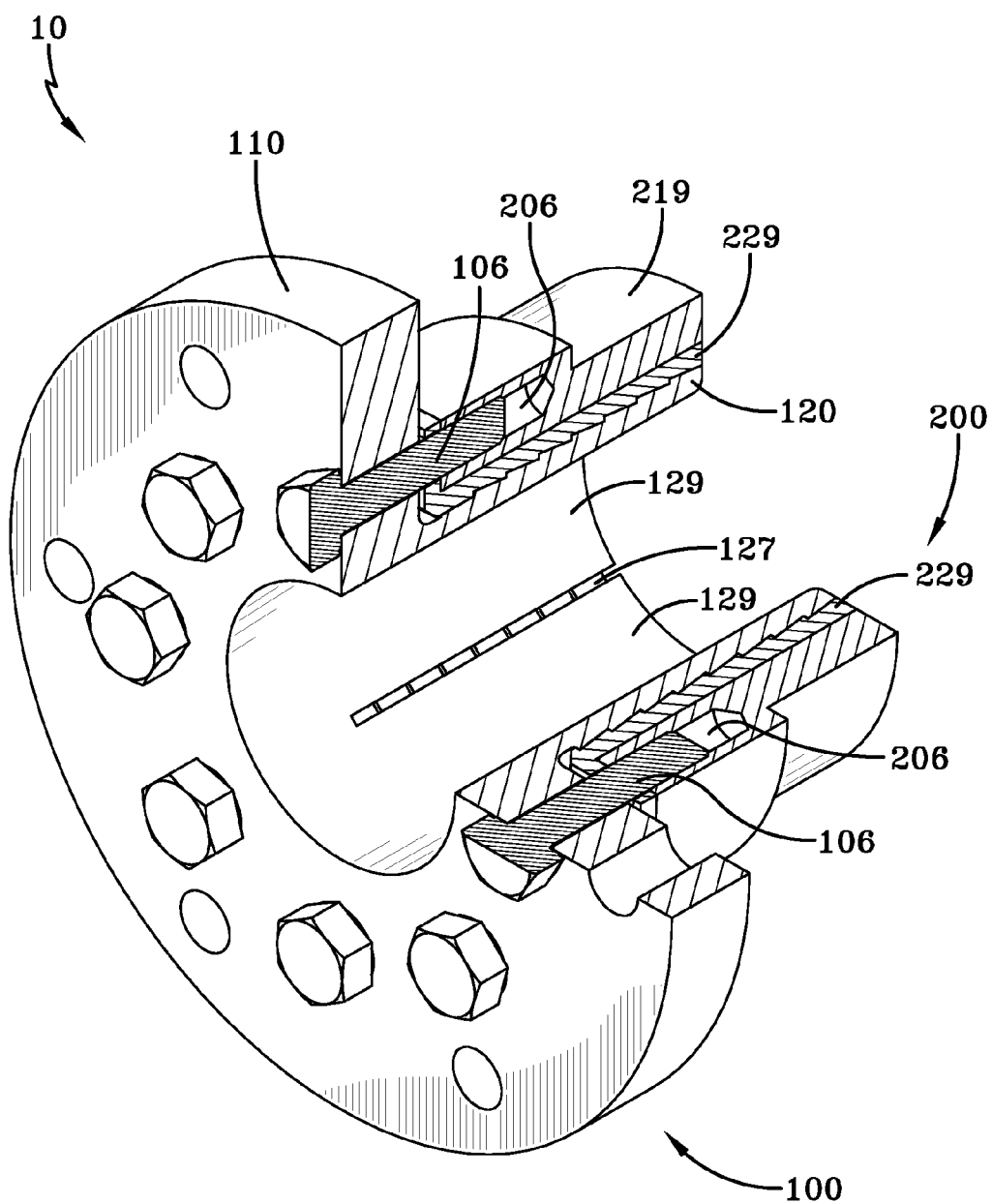
FIG. 6 illustrates a front perspective view of an assembled clamp hub in accordance with another exemplary embodiment, with a portion of the clamp hub removed.

Turning to FIG. 6, an embodiment of a hub clamp assembly 10 is illustrated in which bolts 106 are used in place of the set screws 105, the bolts being received in corresponding apertures 206 of the sleeve engagement pieces 229 and/or the support ring 219. In this embodiment, tightening the bolts draws the collar 219 axially toward the flange 110 of the hub 100.

Although shown and described with respect to set screws or other threaded members, it will be appreciated that any method of exerting a force may be employed that results in an axial movement of the sleeve engagement pieces 229 with respect to the sleeve segments 129 and thereby causes the surface features to engage and reduce the effective diameter of the passageway 125. Exemplary such other methods include the application of hydraulic or electromechanical forces.

Figure 4:
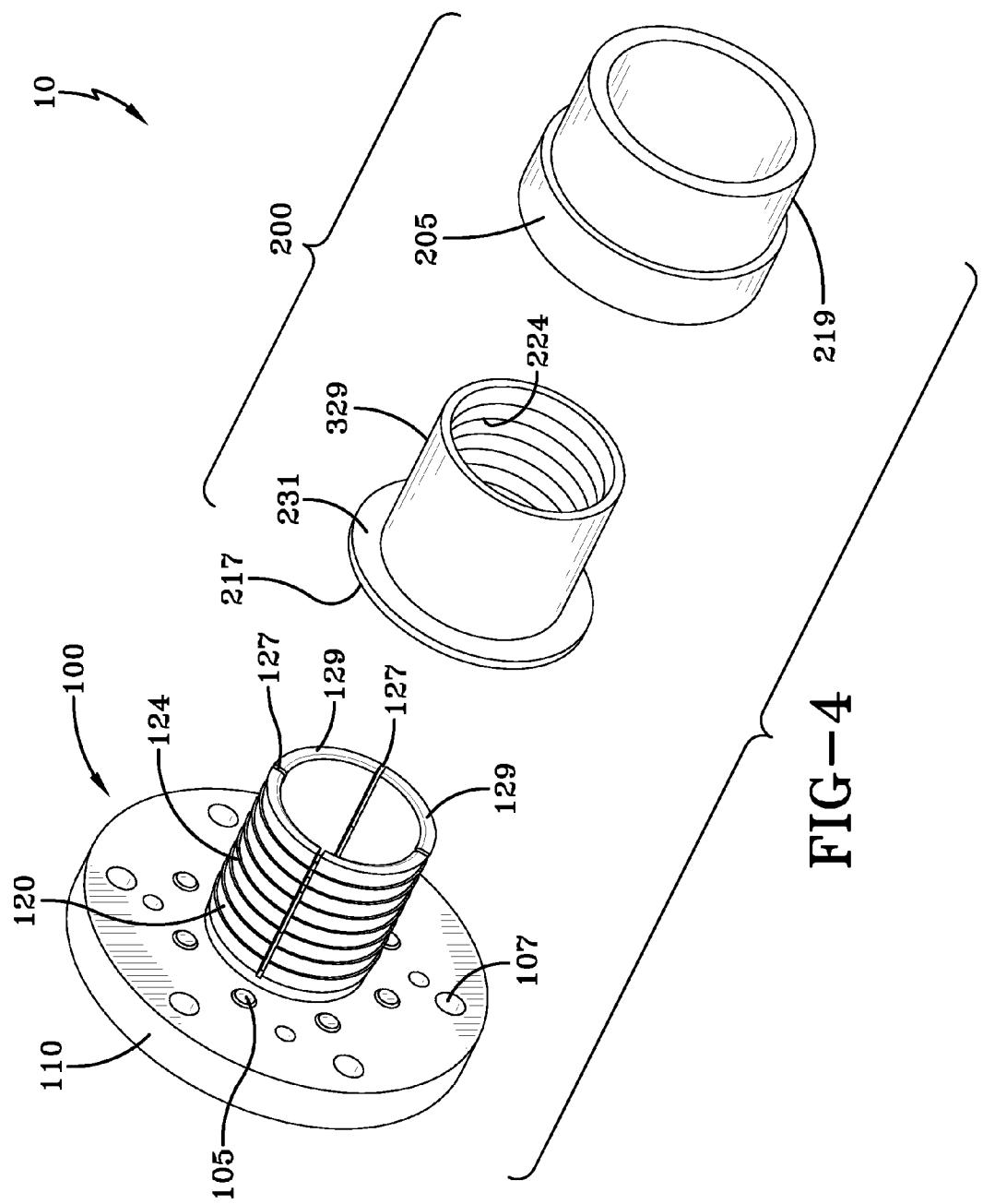
FIG. 4 illustrates an exploded view of a clamp hub in accordance with another exemplary embodiment.

In an alternative embodiment shown in FIG. 4, a single sleeve engagement piece 329 is provided instead of a plurality of sleeve engagement pieces 229. In this embodiment, a threaded engagement provides the mating surface features of the sleeve portion 120 and those of the sleeve engagement piece 329. Despite the use threads, by using a sleeve engagement piece 329 that is comparatively thinner and lighter than the support ring 219, advantages of handling can still be achieved since the piece to be threaded is relatively light compared to the weight of the collar.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A hub clamp assembly comprising:
a hub, the hub comprising
a flange portion, and
an annular sleeve portion, the flange portion and annular sleeve portion together defining a common passageway through the hub, the sleeve portion having a plurality of substantially longitudinal slits therein extending from a distal end toward the flange portion to form a plurality of sleeve segments, the sleeve portion further having an outer surface comprising concentric, unthreaded grooves; and
an annular collar, the annular collar comprising:
a plurality of sleeve engagement pieces together substantially surrounding the sleeve portion, each sleeve engagement piece having a first surface and an opposing second surface, the first surface containing concentric, unthreaded grooves slidably engaged with the concentric, unthreaded grooves of the outer surface of the sleeve portion, and
a support ring surrounding the sleeve portion of the hub and overlying the second surfaces of the sleeve engagement pieces;
wherein each sleeve engagement piece includes a lip intermediate the flange portion and the support ring and wherein the hub and annular collar are configured to cooperatively clamp a shaft within the common passageway through the hub,
wherein the hub is provided with a plurality of threaded members in the flange portion for engaging the lip of the sleeve engagement piece, the lip in turn contacting a facing surface of the support ring to apply an axial force thereto, the threaded members urging the collar axially away from the flange portion to an operative position along the length of the sleeve portion such that the grooves of the sleeve engagement pieces slide against the grooves of the sleeve portion, thereby forcing the sleeve engagement pieces radially inward to exert a clamping force.

2. The assembly of claim 1, wherein the sleeve portion is keyless.

3. The assembly of claim 1 having from two to five sleeve engagement pieces.

4. The assembly of claim 1, wherein the support ring comprises two separate support ring units.

5. A hub clamp assembly comprising:
a hub, the hub comprising:
a flange portion having a plurality of apertures about its periphery configured to be attached to a mechanical device to which rotational energy is to be transferred from a shaft, and
an annular sleeve portion, the flange portion and annular sleeve portion together defining a common passageway through the hub, the sleeve portion having a plurality of substantially longitudinal slits therein extending from a distal end toward the flange portion to form a plurality of sleeve segments, the sleeve portion further having an outer surface comprising concentric, unthreaded grooves; and
an annular collar, the annular collar comprising:
a plurality of sleeve engagement pieces together substantially surrounding the sleeve portion, each sleeve engagement piece having a first surface and an opposing second surface, the first surface containing concentric, unthreaded grooves slidably engaged with the concentric, unthreaded grooves of the outer surface of the sleeve portion, and
a support ring surrounding the sleeve portion of the hub and overlying the second surfaces of the sleeve engagement pieces, the sleeve engagement piece including a lip intermediate the flange portion and a facing surface of the support ring, the lip in contact with the facing surface of the support ring;
wherein a plurality of threaded members extend through the flange portion to engage the collar, the threaded members configured to cause axial movement of the collar with respect to the sleeve segments such that the grooves of the sleeve engagement pieces slide against the grooves of the sleeve portion, thereby forcing the sleeve engagement pieces radially inward to exert a clamping force on the shaft.

6. The assembly of claim 5, wherein the plurality of threaded members are configured to urge the collar axially away from the flange portion to force the sleeve engagement pieces radially inward to exert the clamping force.

* * * * *